United States Patent Office 3,554,025
Patented Jan. 12, 1971

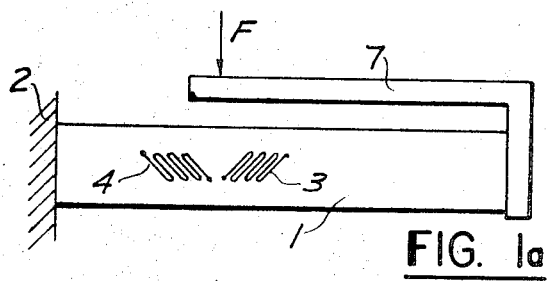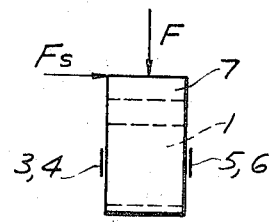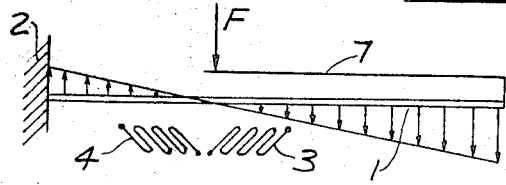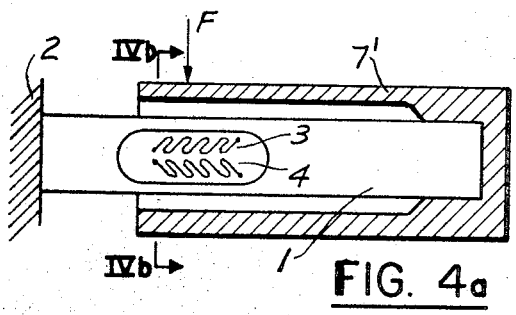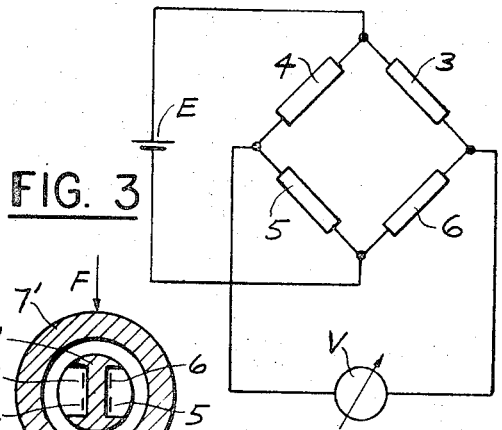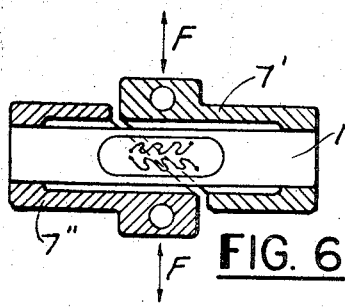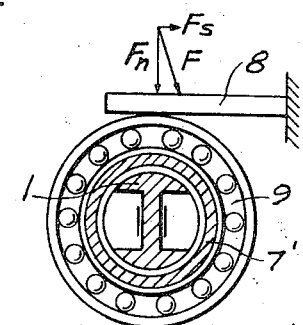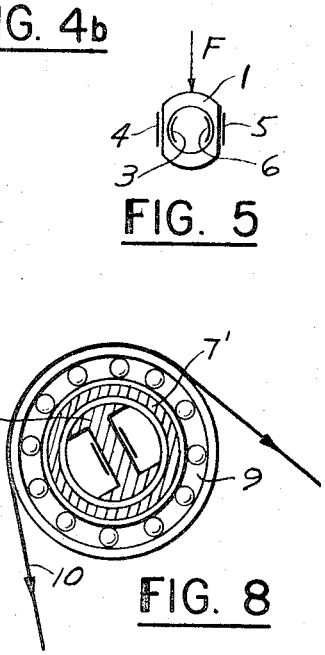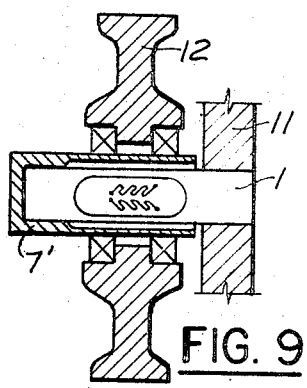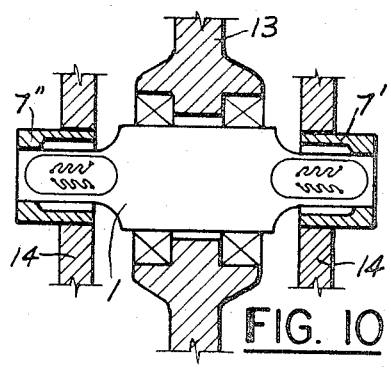

3,554,025
FORCE MEASURING DEVICE
John-Erik Andersson and Rolf Paul Häggström, Karlskogan, Sweden, assignors to Aktiebolaget Bofors, Bofors, Sweden
Filed Jan. 31, 1968, Ser. No. 702,059
Claims priority, application Sweden, Feb. 7, 1967, 1,732/67
Int. Cl. G01l 1/22
U.S. Cl. 73—141
9 Claims

ABSTRACT OF THE DISCLOSURE

A force measuring device including a beam subjected to bending by the force to be measured and one or preferably several electrical impedance strain gages mounted on surfaces of the beam parallel to the bending plane of the beam so as to be responsive to the deformations in the beam caused by the shear strains therein. At least one end of said beam provided with the strain gages is unrestrainedly deflectable and rigidly connected to a second beam member, which extends parallel to and spaced from said first beam and is shorter than this. The free portion of said second beam member is adapted to serve as point of application for the force to be measured.

FIELD OF THE INVENTION

This invention relates to a load or force measuring or weighing device and more particularly to a bending beam type load weighing or force measuring device, which includes a beam-shaped member subjected to bending by the force or load to be measured and one or several electrical impedance strain gages mounted on the beam so as to be affected by the deformations in the beam material due to the bending of the beam.

DESCRIPTION OF THE PRIOR ART

In load weighing devices of this bending beam-type it is known in the art to mount the strain gages on a beam surface substantially parallel to the bending plane of the beam in such a manner that the strain gages are affected substantially only by the deformations of the beam material caused by the shear strains in the beam. Such an arrangement of the strain gages on the beam has the important advantage that the strain gages will to a substantial degree be insensitive to the magnitude of the bending moment in the beam and thus to any displacement or variation of the point of application of the force to be measured, which is applied to the beam so as to bend the same. The strain gages can in this case also be arranged in such a manner that they will to a high degree be insensitive to the effect of axial forces acting upon the beam as well as of transverse forces subjecting the beam to a bending in a direction perpendicular to the force to be measured. In order to achieve these advantages it is necessary, however, that the strain gages are located very accurately on the beam.

SUMMARY OF THE INVENTION

A primary object of the present invention is therefore to provide a force measuring device of the bending beam-type described above, which is still more insensitive to bending moments caused by the force to be measured and by any transverse force as well as to the effect of axial forces and torque and which permits very large variations of the position of the point of application for the force to be measured.

Another object of the invention is to provide a force measuring device of this type which is very rigid, that is shows a very small deflection of the beam under the influence of the force to be measured, but which in spite of this has a large measuring sensitivity.

Characteristic for the force measuring device according to the invention is primarily that at least one end of the beam-shaped member provided with the strain gages is unrestrainedly deflectable, and rigidly connected to one end of a second beam member, which extends parallel to and spaced from said first beam and is shorter than this, the portion of said second beam spaced from said first beam being adapted to serve as point of application for the force to be measured. Preferably, the point of application for the force to be measured is located substantially opposite the portion of said first beam where the strain gages are mounted. In certain forms of a force measuring device according to the invention also the opposite end of said first beam provided with the strain gages is unrestrainedly deflectable and rigidly connected to one end of a third beam member, which extends parallel to and spaced from said first beam, the free ends of said second and third beams being close to each other and adapted to serve as points of applications for the force to be measured.

In a force measuring device arranged as described above the bending moment in the first beam provided with the strain gages will be substantially zero in the portion of the beam where the strain gages are mounted. Consequently, the strain gages will remain almost completely unaffected by the bending moment in the beam. This will of course be true also with respect to any transverse force applied to the force measuring device in the same point as the force to be measured. In this way the force measuring device becomes very unsensitive to transverse forces. Further, the maximum bending moment created in the first beam will be smaller than if the force to be measured is applied directly to the end of the beam provided with the strain gages, wherefore the deflection of this beam will be smaller without any corresponding reduction of the measuring sensitivity of the device or any corresponding increase of the dimensions of the beam being necessary.

According to the invention it is possible to increase the measuring sensitivity still more and at the same time also increase the insensitivity to displacement of the point of application for the force to be measured without any corresponding increase of the deflection of the beam, if the beam provided with the strain gages is provided, at least in the portion where the strain gages are mounted, with a cross section having a large moment of inertia about the symmetry axis perpendicular to the bending plane and thus a large bending rigidity, but a small material thickness in direction perpendicular to the beam surfaces on which the strain gages are mounted, whereby the shear strains will be large. In order to achieve this the beam provided with strain gages can have a substantial I-shaped cross section with the strain gages mounted on the web of the I-shaped section. In another embodiment of the invention the beam provided with the strain gages can be tubular at least over the portion where the strain gages are mounted.

BRIEF DESCRIPTION OF THE DRAWING

In the following the invention will be further described with reference to the accompanying drawing, in which:

FIG. 1a and 1b show schematically the general design of a force measuring device according to the invention, shown in side view in FIG. 1a and in an end view in FIG. 1b;

FIG. 2 shows schematically the distribution of the bending moment in the beam provided with the strain gages in a force measuring device as shown in FIGS. 1a and 1b;

FIG. 3 shows a preferred electric circuit for the strain gages in a force measuring device according to the invention;

FIGS. 4a and 4b show schematically in longitudinal section and cross section respectively a second embodiment of a force measuring device according to the invention;

FIG. 5 shows an alternative design of the beam provided with the strain gages in a force measuring device according to the invention;

FIG. 6 shows in longitudinal section still another embodiment of a force measuring device according to the invention, in which both ends of the beam provided with the strain gages are unrestrained with respect to deflection;

FIG. 7 shows schematically and in cross section a special embodiment of a force measuring device according to the invention, in which any transverse components of the force to be measured do not affect the force measuring device;

FIG. 8 illustrates another application of a force measuring device of the type shown in FIG. 7;

FIGS. 9 and 10 show schematically and in longitudinal section two different embodiments of a force measuring device according to the invention serving as a stationary shaft for a rotating member, as for instance a wheel.

In all figures corresponding components are provided with same reference numerals.

DESCRIPTION OF THE PREFERRED EMBODIMENTS

As shown in FIGS. 1a and 1b a force measuring device according to the invention consists generally of a beam 1, which in the present example is assumed to be stationarily clamped at its one end 2. The opposite end of the beam 1, on the contrary, is unrestainedly deflectable and rigidly connected to a second beam member or yoke 7, which extends parallel to and spaced from the beam 1. This second beam 7 is shorter than the first beam 1 and its free end is shaped or adapted to serve as a point of application for the force F to be measured. The beam 1 is consequently subjected to bending by the force F in a plane parallel to the plane of the drawing. On each side of the beam 1 two electrical impedance strain gages, preferably of the electrical resistance filament type, 3, 4 and 5, 6 respectively are mounted in such a way that they are affected by the deformations in the material of the beam in two mutually perpendicular directions both forming an angle of 45° to the longitudinal axis of the beam. The deformations in the beam 1 in these two directions are in principle caused only by the shear strains in the beam, which are in turn proportional only to the shearing forces affecting the beam but independent of the bending moment in the beam and thus of the position of the point of application for the force F. This would be true even if the force F was applied directly to the beam 1, for instance at its unrestrained end. As, however, in the force measuring device according to the invention the force F is applied to the additional second beam member 7, the strain gages 3 to 6 will be still more unaffected by the bending moment in the beam 1. The bending moment in the beam 1 caused by the force F applied to the beam 7 will have a distribution as schematically shown in FIG. 2. Directly below the point of application for the force F the bending moment in the beam 1 caused by this force is zero. The strain gages 3 to 6 are mounted as close as possible to the point of inflexion of the bending moment distribution in the beam and symmetrically on opposite sides of this point, as schematically shown in FIG. 1a and FIG. 2. In this way the bending moment in the beam 1 caused by the force F cannot at all or only in a very negligible extent affect the strain gages. Of course, the same will be true for a bending moment in the beam 1 caused by a transverse force $F_s$ which is applied to the force measuring device in the same point of application as the force F to be measured. Consequently, the force measuring device according to the invention is very unaffected and undisturbed by moments caused by the force F to be measured and by any transverse force $F_s$ that may be present.

The sensitivity of the force measuring device to any transverse forces $F_s$ as well as to axial forces and torque is additionally reduced in that the device is provided with two pair of strain gages 3, 4 and 5, 6 respectively, which are mounted on two beam surfaces disposed symmetrically relative to each other on opposite sides of the bending plane of the beam 1 in such a way that the two strain gages in each pair 3, 4 and 5, 6 respectively are affected by the deformations of the beam material in two mutually perpendicular directions forming an angle of 45° to the longitudinal axis of the beam. In this way the two strain gages 3 and 5 are obviously affected by a compression or negative tension, whereas the two other strain gages 4 and 6 are affected by a tension in the beam material. The four strain gages are electrically connected in the four branches of a conventional electrical Wheatstone-bridge, in the manner shown in FIG. 3. This bridge has in the normal manner its one diagonal connected to a voltage source E and its other diagonal connected to a voltage measuring instrument V. The two gages 4 and 6 affected by tension are connected in two opposite branches of the bridge, whereas the two gages 3 and 5 affected by compression or negative tension are connected in the other opposite branches of the bridge. Under the influence of the shear strains in the beam 1 caused by the force F the resistance of the two strain gages 4 and 6 increases, whereas the resistance of the two other strain gages 3 and 5 decreases, and the unbalance of the bridge measured by the voltage meter V will constitute a measure upon the magnitude of the force F.

A bending strain caused by the force F affects the pairs of strain gages 3, 6 and 4, 5 respectively in such a way that they are subjected to tensions which are equally large but have opposite signs, wherefore no unbalance of the bridge will arise. In this way an additional reduction of the influence of the bending moment is obtained.

A transverse force which is perpendicular to the force F and bends the beam 1 will cause a reduction of the resistance of the two strain gages mounted on the one side of the beam 1 and a corresponding increase of the resistance of the two strain gages mounted on the opposite side of the beam, wherefore no unbalance of the measuring bridge will arise under the influence of such a transverse force. Axial forces acting upon the beam 1 will cause equally large variations in the resistance in all strain gages and can consequently not give cause to any unbalance of the measuring bridge. A torque applied to the beam 1 about its longitudinal axis will have the effect that the pairs of strain gages 3, 6 and 4, 5 respectively are subjected to tensions which are equally large but have opposite signs, wherefore no unbalance can arise in the measuring bridge.

In the embodiment of the invention shown in FIGS. 1a and 1b the two strain gages on each side of the beam 1 are disposed axially spaced in the neutral layer of the beam with respect to the bending strain caused by the force F. Also in this way the influence of the bending moment upon the strain gages is reduced. Alternatively the two strain gages on each side of the beam can instead be disposed above each other symmetrically on opposite sides of the neutral layer of the beam. The two strain gages on the same side of the beam can also be of the so-called cross-grid type.

As can be seen in FIG. 2, the maximum bending moment in the beam 1 of a force measuring device according to the invention is smaller than if the force F is applied directly to the beam 1 at its free end. Due to this the total deflection of the beam 1 becomes smaller and the force measuring device consequently more rigid, without the measuring sensitivity of the device being reduced or the dimensions of the device being increased. Without any reduction of the rigidity of the device its measuring sensitivity and also its insensitivity to displacement of the point of application of the force to be measured can be further increased, if the beam 1 provided with the strain gages has, at least over the portion of the beam where the strain gages are mounted, a special cross section having a large moment of inertia about the symmetry axis perpendicular to the bending plane of the beam but a small material thickness perpendicular to the beam surfaces on which the strain gages are mounted. Due to the large moment of inertia the beam will be rigid with respect to bending and have a small deflection, whereas the reduced material thickness of the beam in the portion where the strain gages are mounted brings about that the shear strains and the deformations caused by these within said portion of the beam become large.

Such a cross section is for instance obtained if the beam is tubular at least over the portion where the strain gages are mounted, as schematically shown for instance in FIG. 5. In this embodiment two of the strain gages are mounted in the bore of the tubular beam 1, whereas the two other strain gages are mounted on the outer surface of the beam. Alternatively, all strain gages can of course be mounted on the outer surface of the beam or inside the bore of the tubular beam. In the last mentioned case the strain gages will be well protected against damages and moisture.

In a particularly preferable embodiment of the invention, however, the beam 1 provided with the strain gages has a substantially I-shaped cross section at least over the portion of the beam where the strain gages are mounted. FIGS. 4a and 4b show schematically a force measuring device of this type. On a beam 1 having such an I-shaped cross section the strain gages 3 to 6 are mounted on the web of the I-shaped section. In this way the strain gages are located very close to the neutral plane of the beam with respect to any bending of the beam caused by a transverse force, wherefore any influence of such a transverse force upon the measurement is further reduced. Of course, the beam 1 can have a substantially I-shaped cross section over its entire length.

Furthermore, in the force measuring device according to the invention shown in FIGS. 4a and 4b the additional second beam rigidly connected to the one end of the beam 1 and serving as point of application for the force F consists of a tube 7', which encloses the beam 1 as a sleeve spaced from the beam 1.

In the embodiments of the invention described in the foregoing it has been assumed that the beam 1 provided with the strain gages is stationarily clamped at its one end. However, a force measuring device according to the invention can also be arranged in such a way that both ends of the beam 1 are unrestrainedly deflectable. A force measuring device of this type can for instance be designed as schematically shown in FIG. 6. In this force measuring device the beam 1 provided with the strain gages is completely unrestrained and at each one of its ends rigidly connected to a tubular second beam 7' and a tubular third beam 7" respectively, in principle in the manner disclosed in FIGS. 4a and 4b. The free ends of the tubular beams 7' and 7" are located close to each other and substantially opposite to the strain gages and are adapted to serve as points of applications for the force F to be measured. In this case this force can be a tensile or compressive force. A force measuring device of this type can preferably be used for measuring the lifting force in a lifting hook or lifting line or as transducer in a weighng machine or similar apparatus.

In many cases it is difficult to avoid that the force to be measured includes also a transverse component which shall not affect or influence the measurement result. As explained in the foregoing, a force measuring device according to the invention can be made substantially completely unsensitive to any such transverse force component, provided that this transverse force component is perpendicular to the axis of symmetry of the cross section of the beam provided with the strain gages. However, it is also possible to arrange a force measuring device according to the invention in such a way that any transverse component of the force to be measured will not even affect or reach the beam 1 provided with the strain gages. This can be achieved with the design of the force measuring device schematically shown in FIG. 7. In this embodiment of the invention the force F to be measuerd, which is assumed to include a transverse component $F_s$ not to affect the measurement and a normal component $F_n$ to be measured, is applied to the force measuring device through a transversely fixed member 8 and a ball bearing 9 or any other suitable rotational bearing which is coaxial with respect to the beam 1 and the tubular beam 7'. The transverse force component $F_s$ will in this case be taken up by the transversely fixed member 8 so that the beam 1 provided with the strain gages is affected only by the normal force component $F_n$. In this way it is made sure that the transverse force component $F_s$ will not affect or influence the measurement, even if the symmetry axis of the cross section of the beam 1 should not be parallel to the normal force component $F_n$, that is perpendicular to the undesired transverse force component $F_s$.

If in a force measuring device of the type shown in FIG. 7 the beam 1 is rotated so that the symmetry axis of the cross section of the beam is no longer parallel but forming a predetermined angle to the normal force component $F_n$ to be measured, the force measuring device will indicate only a portion of the normal force component $F_n$ proportional to the cosine of said angle. Consequently, the measuring sensitivity of the force measuring device is in this way reduced. As obvious from the foregoing such rotation of the beam 1 will in this case not cause the transverse force component $F_s$ to affect or influence the measurement, as this transverse component is taken up by the member 8 and not affecting the beam 1. In a force measuring device of this type, consequently, the measuring sensitivity can be readily adjusted in that the beam 1 is rotated in its fixtures and locked in the desired angular position.

A force measuring device of this design may also be advantageous and preferable, when the desired direction of measuring must be adjustable. This may, for instance, be the case in an application of the type schematically shown in FIG. 8, where the pulling force in a line or strip 10 is to be measured.

The force measuring device according to the invention is in particular advantageous and suitable for measuring the forces and loads acting on a wheel or any other rotating element or member, in which case the force measuring device can be designed to serve as a stationary shaft for the wheel or rotating element. FIG. 9 shows schematically a force measuring device for this purpose in which the beam 1 provided with the strain gages serves as a non-rotating shaft for the rotating wheel 12. The beam 1 is stationarily mounted at one end in a support member or similar member 11 and the wheel is journalled on the sleeve 7', which is mounted on the free end of the beam 1 and surrounds this end.

FIG. 10 shows another embodiment of a force measuring device according to the invention in connection with a rotating member 13, which is journalled on a stationary shaft supported at its two ends. Also in this case the stationary shaft for the rotatable member 13 serves as the beam 1 provided with strain gages in a force measuring device according to the invention. This beam is at both its ends connected to a sleeve 7' and 7" respectively, which encloses the associated end of the beam 1 and is stationarily mounted in the support structure 14 for the rotating member 13. As can be seen in the drawing, the stationary shaft 1 for the rotating member 13 is in this embodiment of the invention provided with two sets of strain gages, one at each end of the shaft, wherefore the force measuring device consists in fact of two rigidly interconnected and with strain gages provided beams which are subjected to bending by the force to be measured.

We claim:

1. A force measuring assemblage comprising in combination:

a first elongate beam freely deflectable at least at one end;

a second elongate beam rigidly secured to a free end of the first beam and doubled back with respect to said first beam lengthwise parallel thereto and spaced apart thererefrom, the outwardly facing long side of said second beam including a point for applying thereto the unknown force to be measured in a direction substantially normal to the longitudinal axes of said first and second beams so as to subject said first beam to bending in a plane including said axes and said direction; and strain gage means mounted on a surface area of a lengthwise wall portion of the first beam substantially parallel to said bending plane of said first beam, said gage means being located substantially opposite to the point of application of said unknown force to the second beam whereby the strain gage means measure shear strains at a portion of the first beam at which the bending moment therein is at a minimum.

2. The assemblage according to claim 1 wherein the second beam is shorter than the first beam and the unknown force is applied to the second beam at a point thereof juxtaposed to an intermediate point of the first beam.

3. The assemblage according to claim 1 wherein said first beam is freely deflectable at both ends, and wherein a third beam rigidly secured to the other end of the first beam is also doubled back with respect to the first beam extending parallel thereto and spaced therefrom past the location of the strain gage means, said third beam being located on the side of the first beam substantially opposite to the location of the second beam and including a second point for application of the unknown force, said second point being located in opposition to the first point of application of the unknown force.

4. The assemblage according to claim 3 wherein said second beam and said third beam are tubular and encompass the first beam.

5. The assemblage according to claim 1 wherein said second beam is tubular and encompasses the first beam.

6. The assemblage according to claim 1 wherein said first beam has a substantially I-shaped cross section for at least part of its length, said strain gage means being located on the web of said I-shaped beam portion.

7. The assemblage accordng to clam 1 wherein at least the portion of the first beam having thereon the strain gage means is tubular.

8. The assemblage according to claim 1 and comprising a rotatable bearing means mounted on the second beam encompassing the same coaxial with the first beam, said bearing means transmitting the unknown force to the first beam.

9. The assemblage according to claim 1 wherein said strain gage means are electric impedance strain gage means.

References Cited

UNITED STATES PATENTS

| | | | |
|---|---|---|---|
| 3,059,710 | 10/1962 | Pien | 73—88.5X |
| 3,224,262 | 12/1965 | Shipley | 73—136 |
| 3,260,106 | 7/1966 | Hull et al | 73—88.5X |
| 3,320,569 | 5/1967 | Jones | 73—141X |
| 3,321,964 | 5/1967 | Kooman | 73—141 |
| 3,341,796 | 9/1967 | Eisele | 73—141X |
| 3,365,689 | 1/1968 | Kutsay | 73—141X |

CHARLES A. RUEHL, Primary Examiner

U.S. Cl. X.R.

73—144; 177—211